(12) United States Patent
Gons

(10) Patent No.: US 11,479,348 B2
(45) Date of Patent: Oct. 25, 2022

(54) POWER MANAGEMENT SYSTEMS FOR MULTI ENGINE ROTORCRAFT

(71) Applicant: Textron Innovations Inc., Providence, RI (US)

(72) Inventor: William Mathisen Gons, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 565 days.

(21) Appl. No.: 16/558,064

(22) Filed: Aug. 31, 2019

(65) Prior Publication Data

US 2021/0061451 A1 Mar. 4, 2021

(51) Int. Cl.
| | |
|---|---|
| *B64C 27/12* | (2006.01) |
| *B64D 31/00* | (2006.01) |
| *F02C 6/20* | (2006.01) |
| *F02C 9/56* | (2006.01) |
| *F02C 9/44* | (2006.01) |
| *F02C 9/48* | (2006.01) |
| *F02C 9/42* | (2006.01) |
| *B64D 27/14* | (2006.01) |
| *B64D 31/06* | (2006.01) |
| *F02C 9/28* | (2006.01) |
| *B64C 27/06* | (2006.01) |
| *B64D 27/24* | (2006.01) |

(Continued)

(52) U.S. Cl.
CPC .............. *B64C 27/12* (2013.01); *B64D 27/14* (2013.01); *B64D 31/00* (2013.01); *B64D 31/06* (2013.01); *F02C 6/206* (2013.01); *F02C 9/28* (2013.01); *F02C 9/42* (2013.01); *F02C 9/44* (2013.01); *F02C 9/48* (2013.01); *F02C 9/56* (2013.01); *B64C 27/06* (2013.01); *B64D 27/24* (2013.01); *B64D 35/08* (2013.01); *B64D 2027/026* (2013.01); *F05D 2220/329* (2013.01); *F05D 2270/13* (2013.01); *F05D 2270/44* (2013.01)

(58) Field of Classification Search
CPC .. B64D 31/06; B64D 35/08; B64D 2027/026; B64D 31/12; B64C 27/12; F02C 9/28; F02C 9/42; F05D 2270/44
See application file for complete search history.

(56) References Cited

U.S. PATENT DOCUMENTS 2,180,599 A * 11/1939 Menasco ................ B64D 35/08
74/661
3,129,768 A 4/1964 Collins
(Continued)

*Primary Examiner* — Christopher D Hutchens
(74) *Attorney, Agent, or Firm* — Lawrence Youst PLLC

(57) ABSTRACT

A power management system for a multi engine rotorcraft having a main rotor system with a main rotor speed. The power management system includes a first engine that provides a first power input to the main rotor system. A second engine selectively provides a second power input to the main rotor system. The second engine has at least a zero power input state and a positive power input state. A power anticipation system is configured to provide the first engine with a power adjustment signal in anticipation of a power input state change of the second engine during flight. The power adjustment signal causes the first engine to adjust the first power input to maintain the main rotor speed within a predetermined rotor speed threshold range during the power input state change of the second engine.

20 Claims, 7 Drawing Sheets

(51) Int. Cl.
*B64D 27/02* (2006.01)
*B64D 35/08* (2006.01)

(56) References Cited

U.S. PATENT DOCUMENTS

| | | | | |
|---|---|---|---|---|
| 3,455,182 | A * | 7/1969 | Kelley | B64C 27/12 |
| | | | | 244/17.11 |
| 3,602,068 | A * | 8/1971 | White | F16H 37/00 |
| | | | | 475/8 |
| 6,698,181 | B2 | 3/2004 | Certain | |
| 10,059,460 | B2 * | 8/2018 | Dauriac | B64D 41/00 |
| 10,280,792 | B2 | 5/2019 | Gons | |
| 10,287,026 | B2 | 5/2019 | Covington et al. | |
| 2008/0283671 | A1 | 11/2008 | Cherepinsky et al. | |
| 2009/0222178 | A1 * | 9/2009 | Vialle | B64C 27/12 |
| | | | | 477/181 |
| 2014/0145028 | A1 * | 5/2014 | Gomez | B64D 31/06 |
| | | | | 244/58 |
| 2015/0100181 | A1 * | 4/2015 | Strauss | B64C 27/12 |
| | | | | 701/3 |
| 2015/0251770 | A1 * | 9/2015 | Bisson | F02C 9/42 |
| | | | | 244/58 |
| 2017/0225573 | A1 * | 8/2017 | Waltner | B60L 50/16 |
| 2017/0240290 | A1 * | 8/2017 | Dumur | B64D 31/04 |
| 2018/0201386 | A1 * | 7/2018 | Strauss | B64C 27/12 |
| 2019/0382124 | A1 * | 12/2019 | Massot | B64D 35/08 |
| 2020/0298988 | A1 * | 9/2020 | LaTulipe | B64D 35/08 |
| 2020/0361620 | A1 * | 11/2020 | Beauchesne-Martel | |
| | | | | B64C 27/12 |
| 2020/0362754 | A1 * | 11/2020 | Beauchesne-Martel | |
| | | | | F02C 6/02 |
| 2020/0388092 | A1 * | 12/2020 | Manoukian | G07C 5/0816 |
| 2020/0408148 | A1 * | 12/2020 | Beauchesne-Martel | |
| | | | | B64C 27/14 |

\* cited by examiner

POWER MANAGEMENT SYSTEMS FOR MULTI ENGINE ROTORCRAFT

TECHNICAL FIELD OF THE DISCLOSURE

The present disclosure relates, in general, to power management systems for multi engine rotorcraft and, in particular, to power management systems operable to increase or decrease the power input of a main rotorcraft engine in anticipation of a power input state change of a supplemental power unit during flight.

BACKGROUND

Many rotorcraft are capable of taking off, hovering and landing vertically. One such rotorcraft is a helicopter, which has a main rotor that provides lift and thrust to the aircraft. The main rotor not only enables hovering and vertical takeoff and landing, but also enables forward, backward and lateral flight. These attributes make helicopters highly versatile for use in congested, isolated or remote areas. The power demand on the engine of a rotorcraft can vary over time based upon the operation being performed. For example, an increased power demand may be placed on the rotorcraft's engine during takeoff, hover, heavy lifts and/or high speed operations.

Some rotorcraft utilize an auxiliary power unit to supply preflight power during startup procedures and to start the main engine of the rotorcraft. During high power demand operations, such an auxiliary power unit may also serve as a supplemental power unit to provide supplemental power to the main rotor. It has been found, however, that upon coupling the supplemental power unit to the main rotor gearbox during flight, the sudden increase in power delivered to the main rotor may result in a temporary increase in rotor speed including the potential for rotor overspeed. Likewise, it has been found, that upon decoupling the supplemental power unit from the main rotor gearbox during flight, the sudden decrease in power delivered to the main rotor may result in a temporary decrease in rotor speed or rotor droop. Such undesired changes in rotor speed may predispose the rotorcraft to operational hazards and inefficiencies. Accordingly, a need has arisen for a power management system for multi engine rotorcraft operable to maintain substantially constant rotor speed during power input state changes associated with the on demand use of a supplemental power unit during flight.

SUMMARY

In a first aspect, the present disclosure is directed to a power management system for a multi engine rotorcraft having a main rotor system with a main rotor speed. The power management system includes a first engine providing a first power input to the main rotor system. A second engine selectively provides a second power input to the main rotor system. The second engine has at least a zero power input state and a positive power input state. A power anticipation system is configured to provide the first engine with a power adjustment signal during flight in anticipation of a power input state change of the second engine. The power adjustment signal causes the first engine to adjust the first power input to maintain the main rotor speed within a predetermined rotor speed threshold range during the power input state change of the second engine.

In certain embodiments, the first engine may be a main engine and the second engine may be a supplemental power unit. In some embodiments, the first engine may be a first main engine and the second engine may be a second main engine. In certain embodiments, the first engine may be a gas turbine engine and the second engine may be a gas turbine engine. In some embodiments, the first engine may be a gas turbine engine and the second engine may be an electric motor. In certain embodiments, the power anticipation system may include a pilot operated input configured to generate the power adjustment signal for the first engine and to provide the second engine with a power input state change signal. In some embodiments, the power anticipation system may include one or more sensors configured to detect one or more flight parameters of the rotorcraft to form sensor data and a power anticipation module configured to generate the power adjustment signal for the first engine and to provide the second engine with the power input state change signal responsive to the sensor data. In such embodiments, the sensor data may include collective control data, first engine speed data and/or first engine torque output data. In certain embodiments, the power anticipation module may be implemented on a flight control computer.

In some implementations, the power adjustment signal may cause the first engine to reduce the first power input coincident with the second engine changing power input states from the zero power input state to the positive power input state. In certain implementations, the power adjustment signal may cause the first engine to increase the first power input coincident with the second engine changing power input states from the positive power input state to the zero power input state. In some embodiments, the power adjustment signal may cause an adjustment in the quantity of fuel injected into the first engine. In certain embodiments, the positive power input state of the second engine may include a full power input state. In some embodiments, the power adjustment signal may be mechanically coupled to the first engine. In certain embodiments, the power adjustment signal may be electrically coupled to the first engine. In some implementations, the predetermined rotor speed threshold range may be two percent above and below the main rotor speed, one percent above and below the main rotor speed or other desired rotor speed threshold range.

In a second aspect, the present disclosure is directed to a rotorcraft including a fuselage and a main rotor system rotatable relative to the fuselage. The main rotor system has a main rotor speed. A first engine provides a first power input to the main rotor system. A second engine selectively provides a second power input to the main rotor system. The second engine has at least a zero power input state and a positive power input state. A power anticipation system is configured to provide the first engine with a power adjustment signal during flight in anticipation of a power input state change of the second engine. The power adjustment signal causes the first engine to adjust the first power input to maintain the main rotor speed within a predetermined rotor speed threshold range during the power input state change of the second engine.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
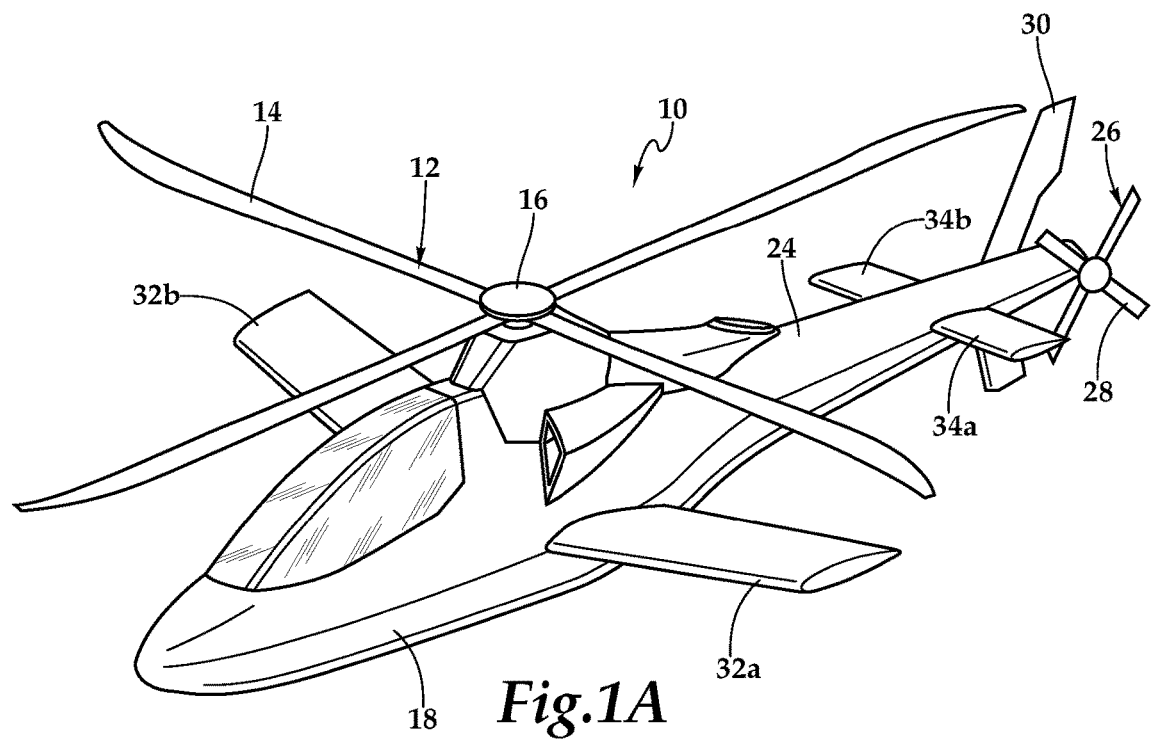
FIGS. 1A-1C are schematic illustrations of an exemplary multi engine rotorcraft utilizing a power management system in accordance with embodiments of the present disclosure.
Figure 1B:
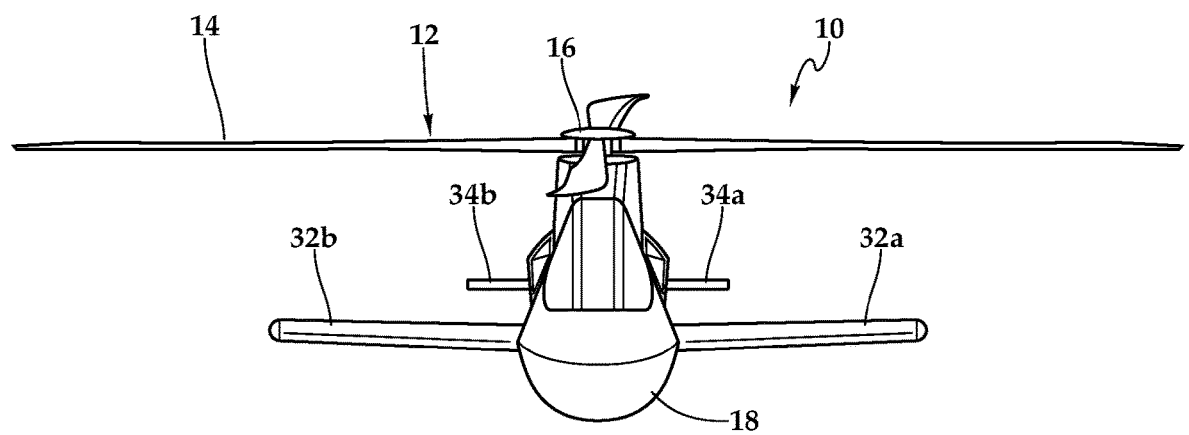
Figure 1C:
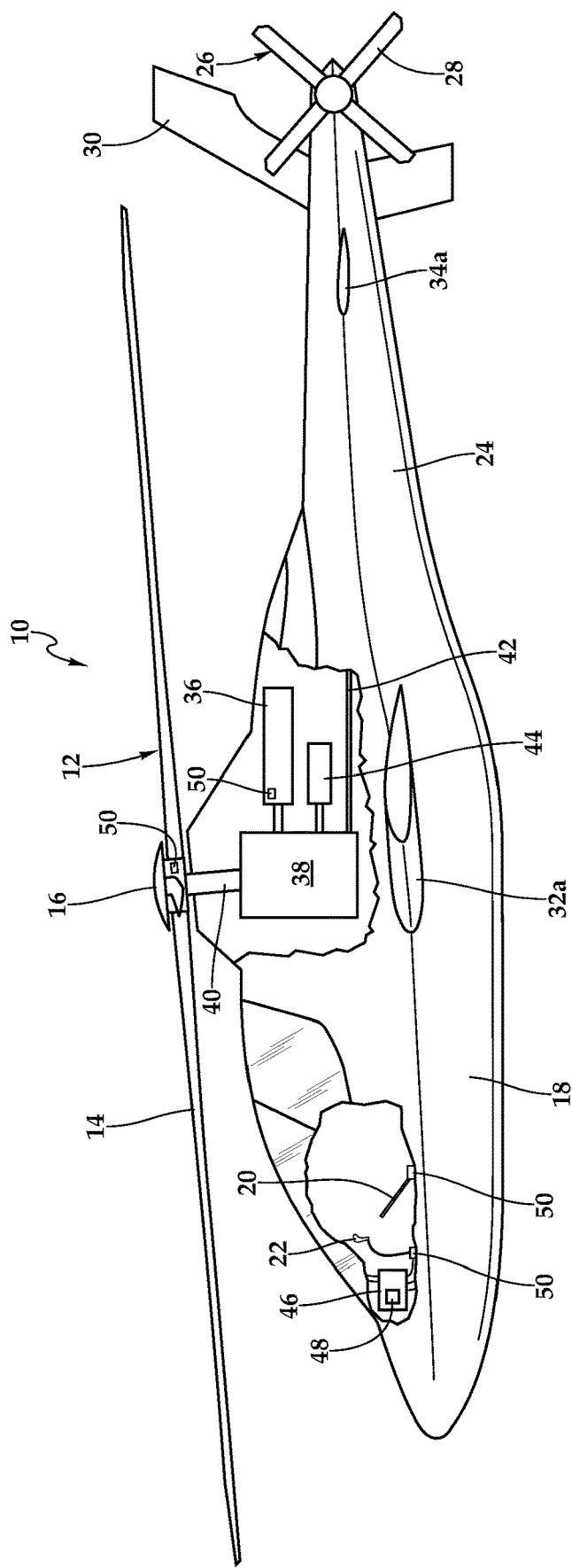

Referring to FIGS. 1A-1C in the drawings, a rotorcraft in the form of a helicopter is schematically illustrated and generally designated 10. The primary propulsion for helicopter 10 is a main rotor system 12. Main rotor system 12 includes a plurality of rotor blades 14 extending radially outward from a main rotor hub 16. Main rotor system 12 is coupled to a fuselage 18 and is rotatable relative thereto. The pitch of rotor blades 14 can be collectively and/or cyclically manipulated to selectively control direction, thrust and lift of helicopter 10. A collective control 20 may be used to control the altitude and/or speed of helicopter 10 by simultaneously changing the pitch angle of all rotor blades 14 independently of their position. For example, during a stable hover, if pilot input is made to collective control 20, the pitch angle of all rotor blades 14 changes simultaneously and equally, resulting in helicopter 10 either increasing or decreasing in altitude. A cyclic control 22 may be used to control the attitude and/or direction of helicopter 10 by controlling the pitch of rotor blades 14 cyclically, that is, the pitch of each rotor blade 14 will vary during each rotation. The variation in pitch has the effect of varying the angle of attack of, and thus the lift generated by, each rotor blade 14 as it rotates. Thus, if cyclic control 22 is moved forward or backward, main rotor system 12 generates thrust in the forward direction or backward direction, respectively. Similarly, if cyclic control 22 is moved to the right or to the left, main rotor system 12 generates thrust in the right direction or left direction, respectively.

A tailboom 24 extends from fuselage 18 in the aft direction. An anti-torque system 26 includes a tail rotor assembly 28 coupled to an aft end of tailboom 24. Anti-torque system 26 controls the yaw of helicopter 10 by counteracting the torque exerted on fuselage 18 by main rotor system 12. In the illustrated embodiment, helicopter 10 includes a vertical tail fin 30 that provide stabilization to helicopter 10 during high speed forward flight. In addition, helicopter 10 includes wing members 32a, 32b that extend laterally from fuselage 18 and wing members 34a, 34b that extend laterally from tailboom 24. The wing members provide lift to helicopter 10 responsive to the forward airspeed of helicopter 10, thereby reducing the lift requirement on main rotor system 12 and increasing the top speed of helicopter 10

Main rotor system 12 and tail rotor assembly 28 receive torque and rotational energy from a main engine 36. Main engine 36 is coupled to a main rotor gearbox 38 by suitable gearing, clutching and shafting. Main rotor gearbox 38 is coupled to main rotor system 12 by a mast 40 and is coupled to tail rotor assembly 28 by tail rotor drive shaft 42. Main engine 36 may be an internal combustion engine such as a turbo shaft engine. In the illustrated embodiment, a supplemental power unit 44 is coupled to main rotor gearbox 38 by suitable gearing, clutching and shafting. Supplemental power unit 44 may be an internal combustion engine such as a turbo shaft engine. Alternatively, supplemental power unit 44 may be an electric motor.

Supplemental power unit 44 may operate as an auxiliary power unit to provide preflight power to the accessories of helicopter 10 such as electric generators, hydraulic pumps and the like as well as to provide the power required to start main engine 36. Supplemental power unit 44 may also be operable to provide emergency power to main rotor system 12. For example, in the event of a failure of main engine 36, supplemental power unit 44 is operable to provide emergency power to enhance the autorotation and flare recovery maneuver of helicopter 10. Use of supplemental power unit 44 not only enhances the safety of helicopter 10 but also increases the efficiency of helicopter 10. For example, having the extra power provided by supplemental power unit 44 during high power demand operations allows main engine 36 to be downsized for more efficient single engine operations such as during cruise operations.

Importantly, supplemental power unit 44 is operable to provide supplemental power that is additive with the power provided by main engine 36 during, for example, takeoff, hover, heavy lifts, high speed operations and other high power demand conditions. As stated herein, upon coupling a supplemental power unit to the main rotor gearbox during flight, the sudden increase in power delivered to the main rotor may result in a temporary increase in rotor speed including the potential for rotor overspeed. Also, upon decoupling the supplemental power unit from the main rotor gearbox during flight, the sudden decrease in power delivered to the main rotor may result in a temporary decrease in rotor speed or rotor droop. Such undesired changes in rotor speed may predispose a rotorcraft to operational hazards and inefficiencies. Helicopter 10 implements a power management system that anticipates power input state changes of supplemental power unit 44 and provides a power adjustment signal to main engine 36 to compensate for the sudden changes in power provided by supplemental power unit 44, thereby maintaining main rotor system 12 at a substantially constant main rotor speed.

Helicopter 10 is preferably a fly-by-wire rotorcraft that includes a flight control computer 46 implementing a variety of flight control modules including, for example, a power anticipation module 48. Power anticipation module 48 utilizes pilot input and/or sensor input in determining that a power input state change of supplemental power unit 44 should occur. For example, if it is desired to cruise at a high speed, the pilot may provide input to initiate the operation of supplemental power unit 44 from a zero power input state to a full power input state. As supplemental power unit 44 is preferable separated from main gearbox 38 by a one-way clutch, the power input of supplemental power unit 44 is not immediately available to main gearbox 38 while supplemental power unit 44 ramps up to full speed. When the operating speed of supplemental power unit 44 matches that of main gearbox 38, torque is now transferable through the one-way clutch. As supplemental power unit 44 is now operable to provide full power, engagement of supplemental power unit 44 to main gearbox 38 delivers a sudden power increase rather than a gradual power increase. To compensate for the step change in power delivered to main gearbox 38, power anticipation module 48 sends a power adjustment signal to main engine 36. In the present example, the power adjustment signal sent to main engine 36 from power anticipation module 48 causes a reduction in the quantity of fuel injected into main engine 36 which results in a decrease in the power input from main engine 36 that coincides with the increase in power input created by engaging supplemental power unit 44 with main gearbox 38. By matching or substantially matching the power reduction of main engine 36 with the power coming online from supplemental power unit 44, the power delivered to main gearbox 38 remains substantially constant such that the main rotor speed remains substantially constant and/or within a predetermined rotor speed threshold during engagement of supplemental power unit 44 with main gearbox 38 during flight.

In some implementations, power anticipation module 48 may autonomously determine that a power input state change of supplemental power unit 44 should occur responsive to acquired sensor data relating to one or more flight parameters. For example, if it is desired to reduce the cruise speed of helicopter 10 from a high speed regime in which supplemental power unit 44 is operating in its full power input state and providing a portion of the total power to main rotor system 12, the pilot may decrease collective to reduce the forward airspeed of helicopter 10. One or more sensors 50 that are operable to detect changes in various flight parameters such as collective position, main rotor actuator position, main engine torque, main engine RPMs, airspeed, altitude or other parameter may provide sensor data to power anticipation module 48. Power anticipation module 48 is in data communication with sensors 50 such that power anticipation module 48 may use the sensor data to determine whether a power input state change of supplemental power unit 44 should occur. In this example, responsive to the sensor data, power anticipation module 48 sends a signal to supplemental power unit 44 to transition from its full power input state to its zero power input state.

As supplemental power unit 44 is preferable separated from main gearbox 38 by a one-way clutch, as soon as the operating speed of supplemental power unit 44 falls below that of main gearbox 38, torque is no longer transferable through the one-way clutch and supplemental power unit 44 is operable to provide zero power to main gearbox 38. As such, disengagement of supplemental power unit 44 from main gearbox 38 delivers a sudden power decrease rather than a gradual power decrease. To compensate for this step change in power delivered to main gearbox 38, power anticipation module 48 also sends a power adjustment signal to main engine 36. In the present example, the power adjustment signal sent to main engine 36 from power anticipation module 48 causes an increase in the quantity of fuel injected into main engine 36 which results in an increase in the power input from main engine 36 that coincides with the decrease in power caused by disengaging supplemental power unit 44 with main gearbox 38. By matching or substantially matching the power increase of main engine 36 with the power coming offline from supplemental power unit 44, the power delivered to main gearbox 38 remains substantially constant such that the main rotor speed remains substantially constant and/or within a predetermined rotor speed threshold during disengagement of supplemental power unit 44 from main gearbox 38 during flight. Thus, the power management system implemented by helicopter 10 is operable to improve rotorcraft performance by preventing overspeed and/or drooping of main rotor system 12 responsive to power input state changes associated with the engagement or disengagement of supplemental power unit 44.

It should be appreciated that helicopter 10 is merely illustrative of a variety of aircraft that can implement the embodiments disclosed herein. Indeed, the power management system of the present disclosure may be implemented on any multi engine rotorcraft. Other aircraft implementations can include hybrid aircraft, tiltwing aircraft, tiltrotor aircraft, quad tiltrotor aircraft, unmanned aircraft, gyrocopters, compound helicopters, drones and the like. As such, those skilled in the art will recognize that the power management system of the present disclosure can be integrated into a variety of aircraft configurations. It should be appreciated that even though aircraft are particularly well-suited to implement the embodiments of the present disclosure, non-aircraft vehicles and devices can also implement the embodiments.

Figure 2A:
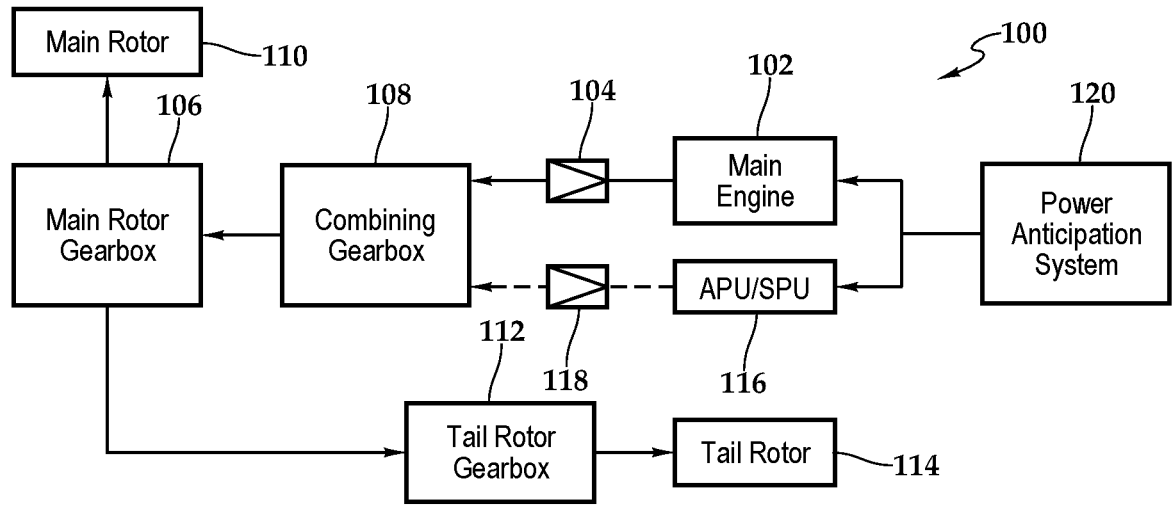
FIGS. 2A-2B are block diagrams of a power management system operating on a multi engine rotorcraft in accordance with embodiments of the present disclosure.
Figure 2B:
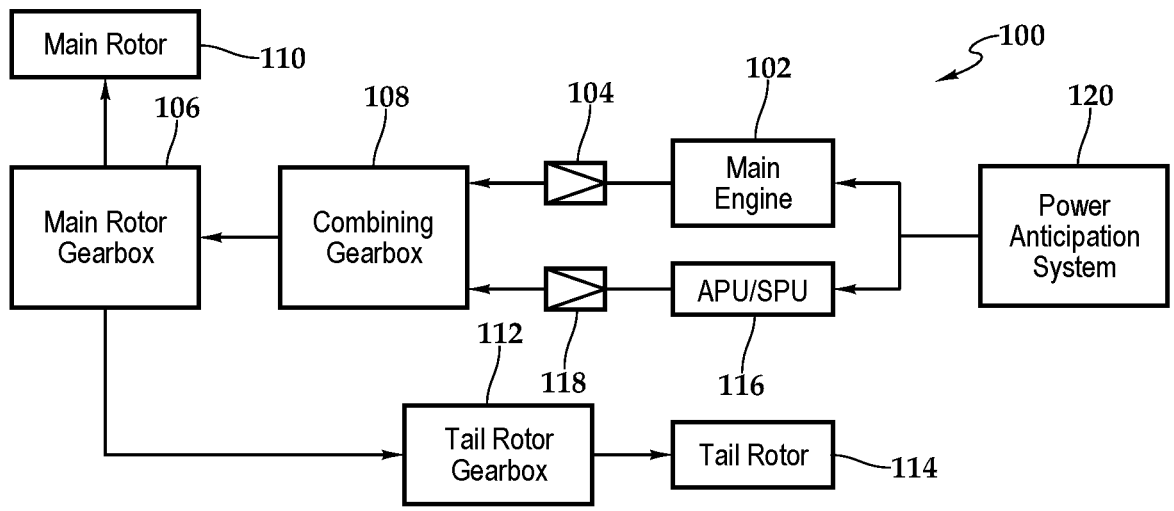

Referring to FIGS. 2A-2B in the drawings, various operating configurations of a power management system 100 for a multi engine rotorcraft are illustrated in a block diagram format. Power management system 100 includes a main engine 102 that may be an internal combustion engine such as a turbo shaft engine. Main engine 102 is coupled to a freewheeling unit depicted as sprag clutch 104 that acts as a one-way clutch enabling a driving mode wherein torque from main engine 102 is coupled to main rotor gearbox 106 via a combining gearbox 108 when the input side rotating speed to sprag clutch 104 is matched with the output side rotating speed from sprag clutch 104. For convenience of illustration, the input side of sprag clutch 104 is depicted as the apex of the greater than symbol and the output side of sprag clutch 104 is depicted as the open end of the greater than symbol. Importantly, sprag clutch 104 has an over running mode wherein main engine 102 is decoupled from main rotor gearbox 106 when the input side rotating speed of sprag clutch 104 is less than the output side rotating speed of sprag clutch 104. Operating sprag clutch 104 in the over running mode allows, for example, main rotor system 110 of helicopter 10 to engage in autorotation in the event of a failure of main engine 102.

In the illustrated embodiment, main rotor gearbox 106 is coupled to main rotor system 110 by a suitable mast. Main rotor gearbox 106 includes a gearbox housing and a plurality of gears, such as planetary gears, used to adjust the engine output to a suitable rotational speed so that main engine 102 and main rotor system 110 may each rotate at optimum speed during flight operations of helicopter 10. Main rotor gearbox 106 is coupled to a tail rotor gearbox 112 via a suitable tail rotor drive shaft. Tail rotor gearbox 112 includes a gearbox housing and a plurality of gears that may adjust the main rotor gearbox output to a suitable rotational speed for operation of tail rotor 114.

Power management system 100 includes a secondary engine depicted as an auxiliary power unit and/or supplemental power unit that is referred to herein as supplemental power unit 116. In the illustrated embodiment, supplemental power unit 116 may be an internal combustion engine such as a turbo shaft engine. In the illustrated embodiment, supplemental power unit 116 may generate between about 5 percent and about 40 percent of the horsepower of main engine 102 or other suitable percentage thereof. Supplemental power unit 116 is coupled to a freewheeling unit depicted as sprag clutch 118 that acts as a one-way clutch enabling a driving mode wherein torque from supplemental power unit 116 is coupled to main rotor gearbox 106 via combining gearbox 108 when the input side rotating speed to sprag clutch 118 is matched with the output side rotating speed from sprag clutch 118. Importantly, sprag clutch 118 has an over running mode wherein supplemental power unit 116 is decoupled from main rotor gearbox 106 when the input side rotating speed of sprag clutch 118 is less than the output side rotating speed of sprag clutch 118. It is noted that supplemental power unit 116 may be operable to perform the functions of a typical auxiliary power unit such as providing power to drive rotorcraft accessories such as one or more generators, one or more hydraulic pumps as well as other accessories (not pictured). In addition, supplemental power unit 116 may provide power for helicopter 10 during the startup procedure and to start main engine 102.

Once main engine 102 is operating, torque is delivered through the main drive system as indicated by the solid lines and arrowheads between main engine 102, sprag clutch 104, combining gearbox 108, main rotor gearbox 106, main rotor system 110, tail rotor gearbox 112 and tail rotor 114, as best seen in FIG. 2A. In the illustrated configuration, no torque is delivered to combining gearbox 108 from supplemental power unit 116 as indicated by the dashed lines between supplemental power unit 116, sprag clutch 118 and combining gearbox 108. As such, all of the power provided to main rotor system 110 is being provided by main engine 102 with zero power being provided by supplemental power unit 116. It is noted that supplemental power unit 116 may continue to perform the functions of a typical auxiliary power unit and/or main engine 102 may provide power to drive rotorcraft accessories.

The operations of engaging and disengaging supplemental power unit 116 to and from main gearbox 106 will now be described. Power management system 100 includes a power anticipation system 120 that may be pilot implemented and/or may be automated by the flight control computer 46 of helicopter 10 via a power anticipation module 48 executing power anticipation logic. In FIG. 2A, main engine 102 is providing all of the power to rotate main rotor system 110 and main rotor system 110 is preferably rotating a constant main rotor speed as indicated by line 130 in FIG. 3A that represents the nominal 100 percent main rotor speed. If it is desired to increase the cruise speed of helicopter 10 from a standard cruise regime to a high speed cruise regime, power anticipation system 120, responsive to pilot input and/or sensor input, may initiate a power input state change sequence for helicopter 10. In the illustrated embodiment, power anticipation system 120 sends a power adjustment signal to main engine 102 and sends a power input state change signal to supplemental power unit 116. For example, the power adjustment signal to main engine 102 may be a mechanically coupled signal to the throttle of main engine 102 causing a decrease in fuel injected into main engine 102. Alternatively, the power adjustment signal to main engine 102 may be an electrically coupled signal to main engine 102 causing a decrease in fuel injected into main engine 102.

The power input state change signal to supplemental power unit 116 transitions supplemental power unit 116 from a zero power input state to a full power input state. For example, supplemental power unit 116 may transition from a non-operating state, an operating in idle mode state or otherwise operating at a speed below which the input side rotating speed of sprag clutch 118 is less than the output side rotating speed of sprag clutch 118. The power input state change signal causes supplemental power unit 116 to ramp up and engage main rotor gearbox 106 when the operating speed of supplemental power unit 116 causes the input side rotating speed of sprag clutch 118 to match the output side rotating speed of sprag clutch 118. Without power anticipation system 120 sending the power adjustment signal to main engine 102, the main rotor speed would temporarily increase, as indicated by line 132 in FIG. 3A, responsive to the sudden increase in power to main rotor system 110. In the present embodiments, however, the power adjustment signal sent to main engine 102 causes a coincident reduction in power from main engine 102 as the step change in power from supplemental power unit 116 is delivered.

Figure 3A:
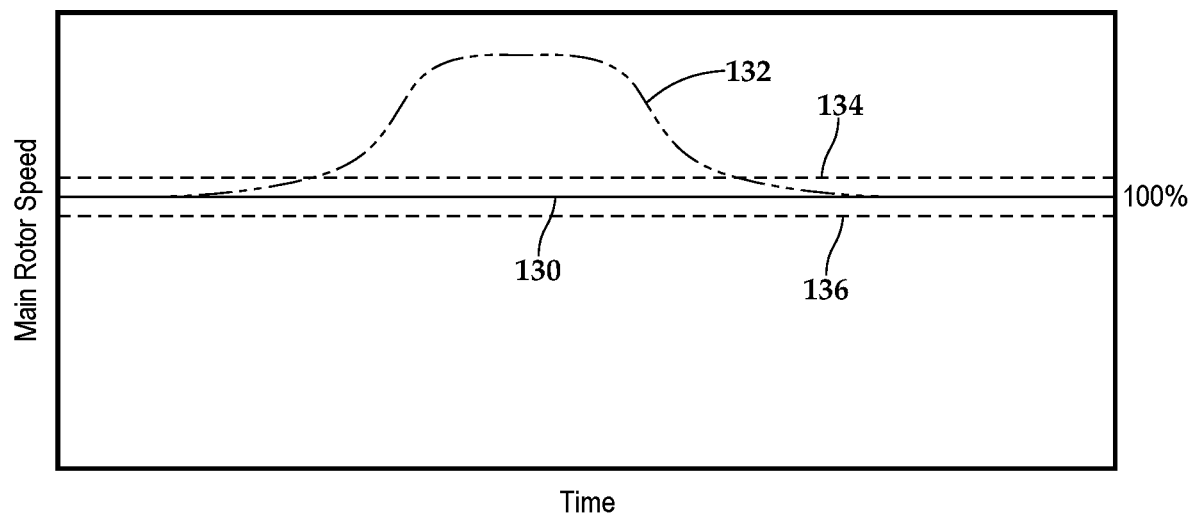
FIGS. 3A-3B are graphical representations of main rotor speed versus time using a power management system on a multi engine rotorcraft in accordance with embodiments of the present disclosure.

The reduction in power from main engine 102 compensates for the increase in power from supplemental power unit 116 such that the main rotor speed remains substantially constant, as indicated by line 130 in FIG. 3A, such as between an upper rotor speed threshold 134 and a lower rotor speed threshold 136. In one implementation, upper rotor speed threshold 134 may be set at 102 percent of main rotor speed 130 and lower rotor speed threshold 136 may be set at 98 percent of main rotor speed 130 forming a rotor speed threshold range of two percent above and two percent below main rotor speed 130. In another implementation, upper rotor speed threshold 134 may be set at 101 percent of main rotor speed 130 and lower rotor speed threshold 136 may be set at 99 percent of main rotor speed 130 forming a rotor speed threshold range of one percent above and one percent below main rotor speed 130. Even though particular rotor speed threshold ranges have been described, it should be understood by those having ordinary skill in the art that rotor speed threshold ranges may be set to any desired value to optimize system design including ranges greater than or less than those recited herein. Once supplemental power unit 116 is operating at full speed, torque is delivered, not only, through the main drive system as indicated by the solid lines and arrowheads between main engine 102, sprag clutch 104, combining gearbox 108, main rotor gearbox 106 and main rotor system 110, but also, through a supplemental drive system as indicated by the solid lines and arrowheads between supplemental power unit 116, sprag clutch 118 and combining gearbox 108, as best seen in FIG. 2B.

When it is desired to decrease the cruise speed of helicopter 10 from the high speed cruise regime, power anticipation system 120, responsive to pilot input and/or sensor input, may initiate a power input state change sequence for helicopter 10. In the illustrated embodiment, power anticipation system 120 sends a power adjustment signal to main engine 102 and sends a power input state change signal to supplemental power unit 116. The power adjustment signal to main engine 102 may be a mechanically coupled or electrically coupled signal causing an increase in fuel injected into main engine 102.

The power input state change signal to supplemental power unit 116 transitions supplemental power unit 116 from the full power input state to a zero power input state. For example, supplemental power unit 116 may transition to an operating speed such that the input side rotating speed of sprag clutch 118 is less than the output side rotating speed of sprag clutch 118, thus decoupling torque to and disengaging from main rotor gearbox 106. Without power anticipation system 120 sending the power adjustment signal to main engine 102, the main rotor speed would temporarily decrease, as indicated by line 142 in FIG. 3B, responsive to the sudden decrease in power to main rotor system 110. In the present embodiments, however, the power adjustment signal sent to main engine 102 causes a coincident increase in power from main engine 102 as the step change in power from supplemental power unit 116 is received.

Figure 3B:
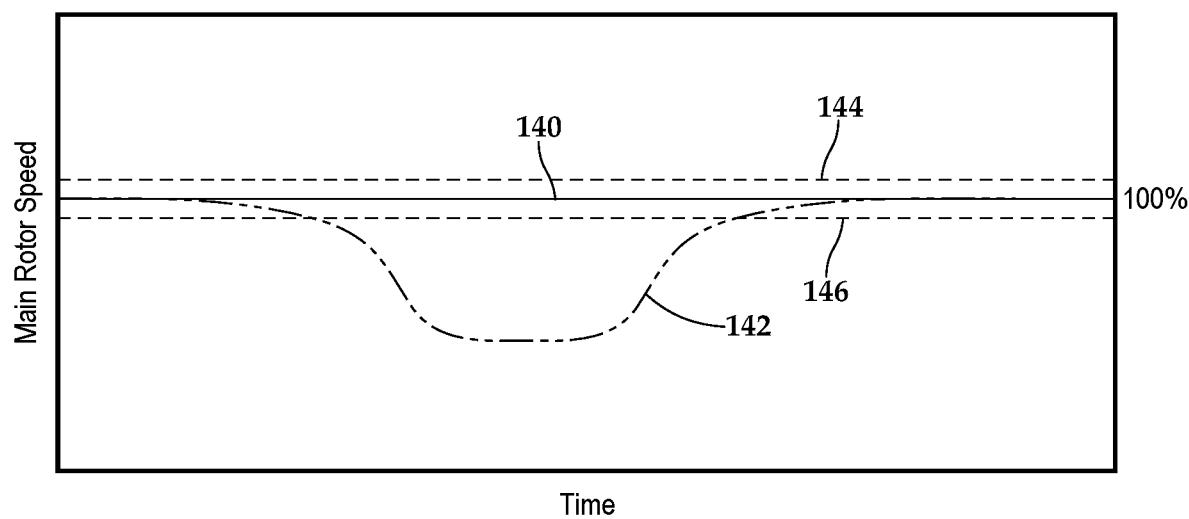

The increase in power from main engine 102 compensates for the decrease in power from supplemental power unit 116 such that the main rotor speed remains substantially constant, as indicated by line 140 in FIG. 3B, such as between an upper rotor speed threshold 144 and a lower rotor speed threshold 146. In one implementation, upper rotor speed threshold 144 may be set at 102 percent of main rotor speed 140 and lower rotor speed threshold 146 may be set at 98 percent of main rotor speed 140 forming a rotor speed threshold range of two percent above and two percent below main rotor speed 140. In other implementations, the rotor speed threshold range may have any desired value to optimize performance. Once supplemental power unit 116 is disengaged, torque is delivered exclusively through the main drive system as indicated by the solid lines and arrowheads between main engine 102, sprag clutch 104, combining gearbox 108, main rotor gearbox 106 and main rotor system 110, and the dashed lines between supplemental power unit 116, sprag clutch 118 and combining gearbox 108, as best seen in FIG. 2A.

Even though the upper rotor speed threshold and the lower rotor speed threshold have been described as having the same deviation from the nominal main rotor speed, it should be understood by those having ordinary skill in the art that an upper rotor speed threshold could have a different deviation from the nominal main rotor speed than a lower rotor speed threshold. Also, even though the upper rotor speed threshold and the lower rotor speed threshold have been described as being the same during engagement and disengagement of supplemental power, it should be understood by those having ordinary skill in the art that the upper and lower rotor speed thresholds could be different depending upon the flight operation being conducted. In addition, even though the power input state changes have been described as transitions between a full power input state and a zero power input state of a supplemental power unit, it should be understood by those having ordinary skill in the art that the benefits of implementing a power management system of the present disclosure can also be achieved when transitioning between other power input states including any number of intermediate power input states between the full power input state and the zero power input state such as a quarter power input state, a half power input state, a three quarter power input state or other positive power input state therebetween.

Figure 4A:
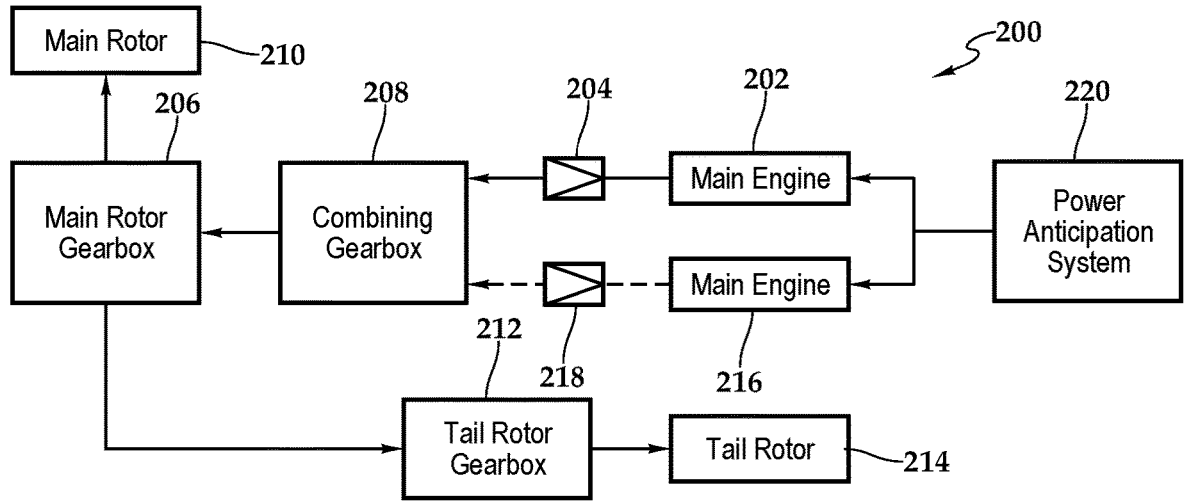
FIGS. 4A-4B are block diagrams of a power management system operating on a multi engine rotorcraft in accordance with embodiments of the present disclosure.
Figure 4B:
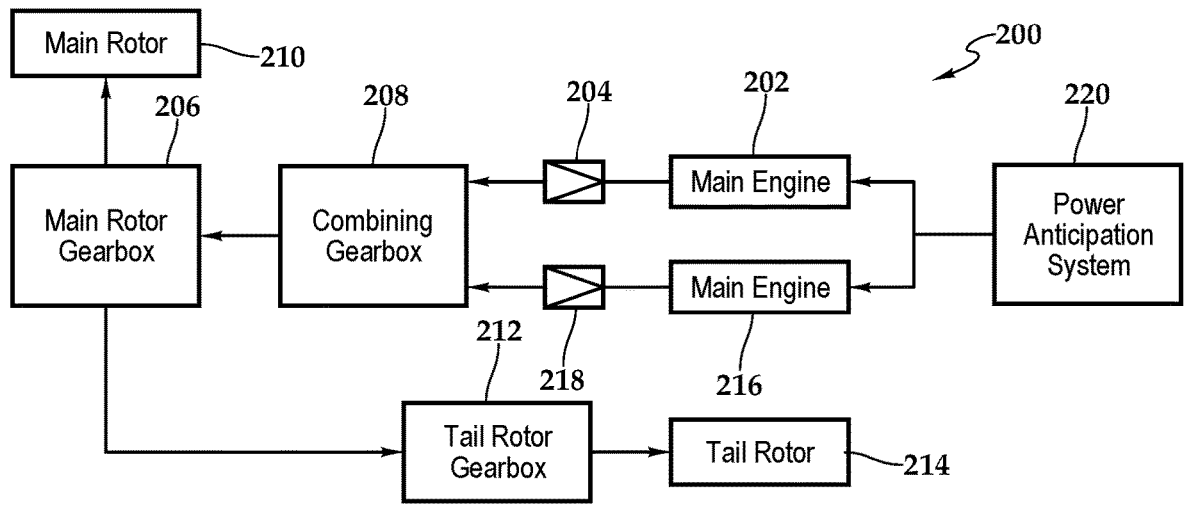

Even though the power anticipation system functionality has been described with reference to a multi engine rotorcraft having a main engine and a supplemental power unit, it should be understood by those having ordinary skill in the art that a power anticipation system of the present disclosure may have benefits on other multi engine rotorcraft. For example, as best seen in FIGS. 4A-4B of the drawings, a power management system 200 is operating in a twin engine rotorcraft. Power management system 200 includes a first main engine 202 such as a turbo shaft engine that is coupled to a freewheeling unit depicted as sprag clutch 204 that acts as a one-way clutch enabling a driving mode wherein torque from main engine 202 is coupled to main rotor gearbox 206 via a combining gearbox 208 and an over running mode wherein main engine 202 is decoupled from main rotor gearbox 206. In the illustrated embodiment, main rotor gearbox 206 is coupled to main rotor system 210 by a suitable mast. Main rotor gearbox 206 is coupled to a tail rotor gearbox 212 via a suitable tail rotor drive shaft. Tail rotor gearbox 212 is coupled to a tail rotor 114. Power management system 200 includes a second main engine 216 such as a turbo shaft engine that is coupled to a freewheeling unit depicted as sprag clutch 218 that acts as a one-way clutch enabling a driving mode wherein torque from main engine 216 is coupled to main rotor gearbox 206 via combining gearbox 208 and an over running mode wherein main engine 216 is decoupled from main rotor gearbox 206.

In certain flight operations such as high efficiency cruise, main engine 202 may be operating to provide torque through the drive system as indicated by the solid lines and arrowheads between main engine 202, sprag clutch 204, combining gearbox 208, main rotor gearbox 206, main rotor system 210, tail rotor gearbox 212 and tail rotor 214, while main engine 216 is not providing torque through the drive system as indicated by the dashed lines between main engine 216, sprag clutch 218 and combining gearbox 208, as best seen in FIG. 4A. If it is desired to transition from high efficiency cruise to high speed cruise, power anticipation system 220, responsive to pilot input and/or sensor input, may initiate a power input state change sequence for the twin engine rotorcraft. For example, power anticipation system 220 sends a power adjustment signal to main engine 202 and sends a power input state change signal to main engine 216. The power input state change signal transitions main engine 216 from a zero power input state to a positive power input state such as a full power input state or other desired percentage of the full power input state. The power input state change signal causes main engine 216 to ramp up and engage main rotor gearbox 206. The power adjustment signal sent to main engine 202 causes a coincident reduction in power from main engine 202 as the step change in power from main engine 216 is delivered, thereby maintaining the main rotor speed substantially constant, such as within upper and lower rotor speed thresholds. Once main engine 216 is engaged, torque is provided through the main drive system as indicated by the solid lines and arrowheads between main engine 202, sprag clutch 204, combining gearbox 208, main rotor gearbox 206 and main rotor system 210, as well as between main engine 216, sprag clutch 218 and combining gearbox 208, as best seen in FIG. 4B.

If it is desired to return to high efficiency cruise, power anticipation system 220, responsive to pilot input and/or sensor input, may initiate a power input state change sequence for the twin engine rotorcraft. In this case, power anticipation system 220 sends a power adjustment signal to main engine 202 and sends a power input state change signal to main engine 216. The power input state change signal transitions main engine 216 from the positive power input state to a zero power input state. The power adjustment signal sent to main engine 202 causes a coincident increase in power from main engine 202 as the step change in power from main engine 216 is received, thereby maintaining the main rotor speed substantially constant, such as within upper and lower rotor speed thresholds. Once main engine 216 is disengaged, torque is delivered through the main drive system as indicated by the solid lines and arrowheads between main engine 202, sprag clutch 204, combining gearbox 208, main rotor gearbox 206 and main rotor system 210, with no torque provided from main engine 216 as indicated by the dashed lines between main engine 216, sprag clutch 218 and combining gearbox 208, as best seen in FIG. 4A. It is noted that the twin engine rotorcraft could alternatively be returned to high efficiency cruise mode by disengaging main engine 202 and exclusively operating main engine 216 in which case, power anticipation system 220 would send the power adjustment signal to main engine 216 and the power input state change signal to main engine 202.

Even though the power anticipation system functionality has been described with reference to a multi engine rotorcraft having two turbo shaft engines, it should be understood by those having ordinary skill in the art that a power anticipation system of the present disclosure may have benefits on rotorcraft utilizing hybrid power systems. For example, as best seen in FIGS. 5A-5D of the drawings, a power management system 300 is operating in a twin engine hybrid rotorcraft. Power management system 300 includes a turbo generator 302 such as a turbo shaft engine that is coupled to or integral with an electric generator. Turbo generator 302 is coupled to a freewheeling unit depicted as sprag clutch 304 that acts as a one-way clutch enabling a driving mode wherein torque from turbo generator 302 is coupled to main rotor gearbox 306 via a combining gearbox 308 and an over running mode wherein turbo generator 302 is decoupled from main rotor gearbox 306. In the illustrated embodiment, main rotor gearbox 306 is coupled to main rotor system 310 by a suitable mast. Main rotor gearbox 306 is coupled to a tail rotor gearbox 312 via a suitable tail rotor drive shaft. Tail rotor gearbox 312 is coupled to a tail rotor 314. Power management system 300 includes an electric motor 316 coupled to one or more batteries and/or the generator of turbo generator 302. In the illustrated embodiment, electric motor 316 is coupled to a freewheeling unit depicted as sprag clutch 318 that acts as a one-way clutch enabling a driving mode wherein torque from electric motor 316 is coupled to main rotor gearbox 306 via combining gearbox 308 and an over running mode wherein electric motor 316 is decoupled from main rotor gearbox 306. In other embodiments, sprag clutch 318 may be optional in which case, electric motor 316 may be coupled directly to combining gearbox 308.

Figure 5A:
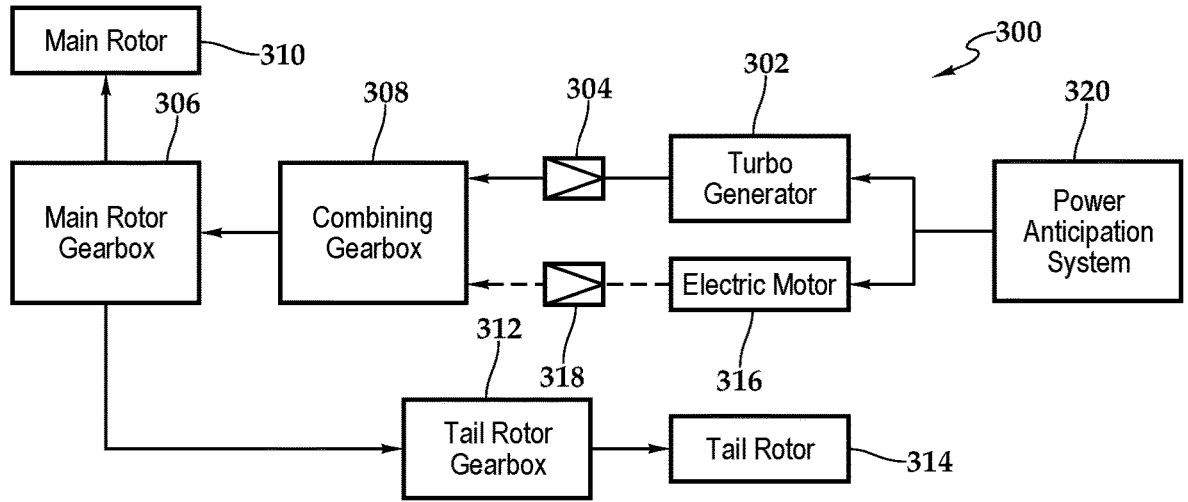
FIGS. 5A-5D are block diagrams of a power management system operating on a multi engine rotorcraft in accordance with embodiments of the present disclosure.
Figure 5B:
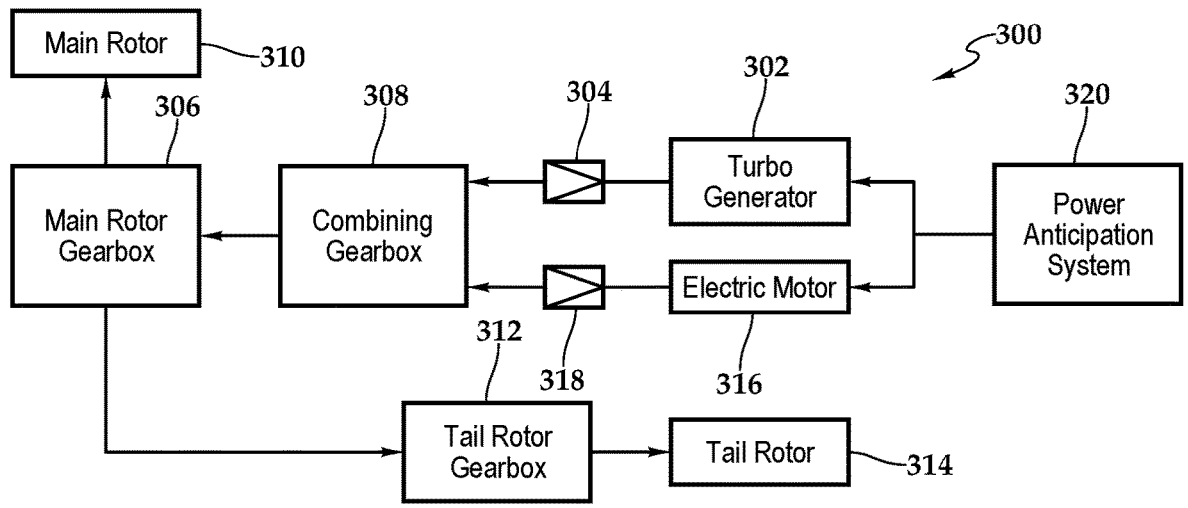

In certain flight operations such as high efficiency cruise, turbo generator 302 may be operating to provide torque through the drive system as indicated by the solid lines and arrowheads between turbo generator 302, sprag clutch 304, combining gearbox 308, main rotor gearbox 306, main rotor system 310, tail rotor gearbox 312 and tail rotor 314, while electric motor 316 is not providing torque through the drive system as indicated by the dashed lines between electric motor 316, sprag clutch 318 and combining gearbox 308, as best seen in FIG. 5A. If it is desired to transition from high efficiency cruise to high speed cruise, power anticipation system 320, responsive to pilot input and/or sensor input, may initiate a power input state change sequence for the twin engine hybrid rotorcraft. For example, power anticipation system 320 sends a power adjustment signal to turbo generator 302 and sends a power input state change signal to electric motor 316. The power input state change signal transitions electric motor 316 from a zero power input state to a positive power input state such as a full power input state or other desired percentage of the full power input state. The power input state change signal causes electric motor 316 to ramp up and engage main rotor gearbox 306. The power adjustment signal sent to turbo generator 302 causes a coincident reduction in power from turbo generator 302 as the step change in power from electric motor 316 is delivered, thereby maintaining the main rotor speed substantially constant, such as within upper and lower rotor speed thresholds. Once electric motor 316 is engaged, torque is provided through the main drive system as indicated by the solid lines and arrowheads between turbo generator 302, sprag clutch 304, combining gearbox 308, main rotor gearbox 306 and main rotor system 310, as well as between electric motor 316, sprag clutch 318 and combining gearbox 308, as best seen in FIG. 5B.

Figure 5C:
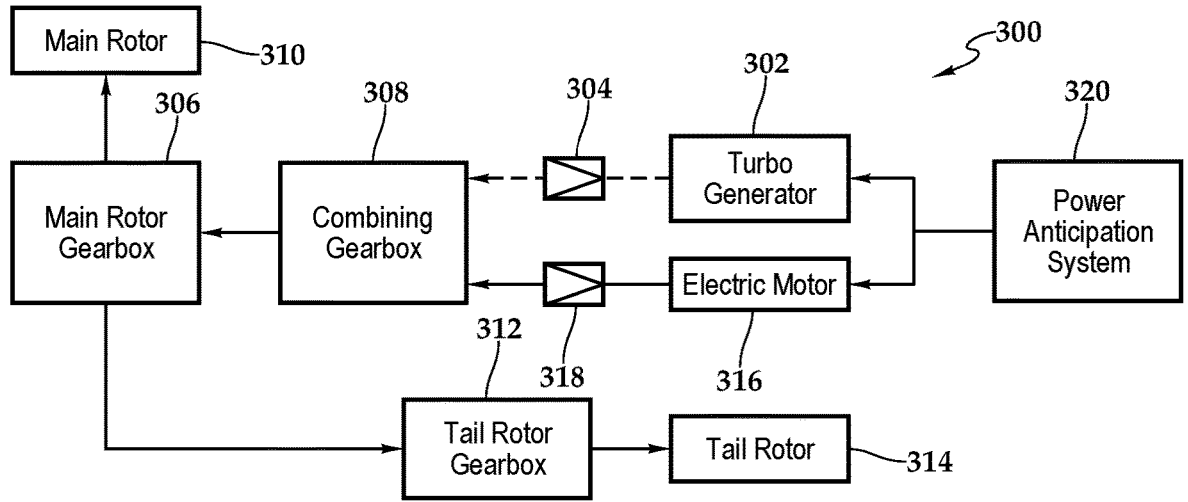

If it is desired to engage in high efficiency electric powered cruise, power anticipation system 320, responsive to pilot input and/or sensor input, may initiate a power input state change sequence for the twin engine hybrid rotorcraft. In this case, power anticipation system 320 sends a power adjustment signal to electric motor 316 and sends a power input state change signal to turbo generator 302. The power input state change signal transitions turbo generator 302 from the positive power input state to a zero power input state. The power adjustment signal sent to electric motor 316 causes a coincident increase in power from electric motor 316 as the step change in power from turbo generator 302 is received, thereby maintaining the main rotor speed substantially constant, such as within upper and lower rotor speed thresholds. Once turbo generator 302 is disengaged, torque is delivered through the main drive system as indicated by the solid lines and arrowheads between electric motor 316, sprag clutch 318, combining gearbox 308, main rotor gearbox 306 and main rotor system 310, with no torque provided from turbo generator 302 as indicated by the dashed lines between turbo generator 302, sprag clutch 304 and combining gearbox 308, as best seen in FIG. 5C.

Figure 5D:
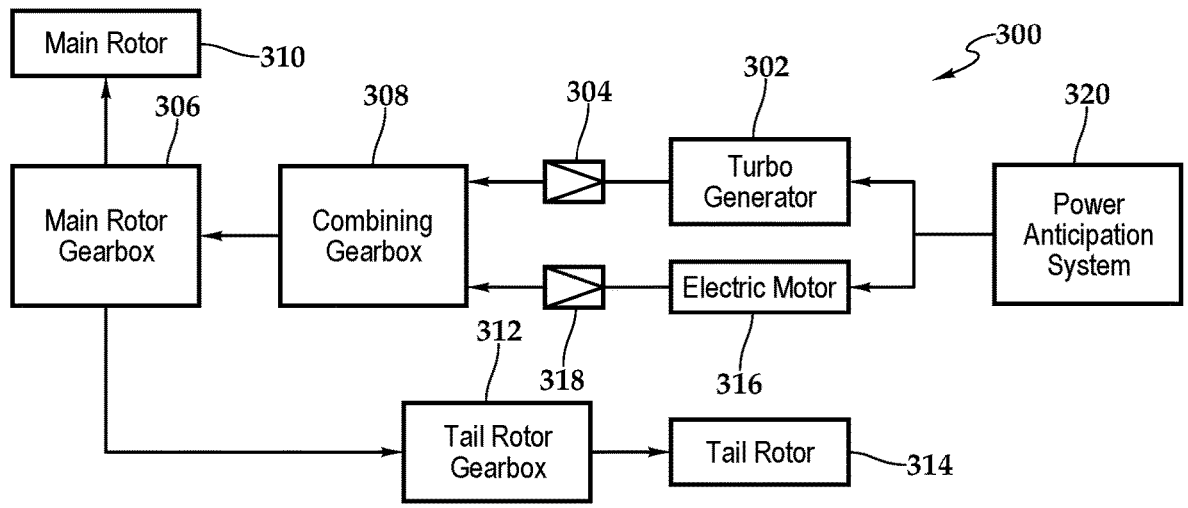

If it is desired to transition from high efficiency electric powered cruise to high speed cruise, power anticipation system 320, responsive to pilot input and/or sensor input, may initiate a power input state change sequence for the twin engine hybrid rotorcraft. For example, power anticipation system 320 sends a power adjustment signal to electric motor 316 and sends a power input state change signal to turbo generator 302. The power input state change signal transitions turbo generator 302 from a zero power input state to a positive power input state such as a full power input state or other desired percentage of the full power input state. The power input state change signal causes turbo generator 302 to ramp up and engage main rotor gearbox 306. The power adjustment signal sent to electric motor 316 causes a coincident reduction in power from electric motor 316 as the step change in power from turbo generator 302 is delivered, thereby maintaining the main rotor speed substantially constant, such as within upper and lower rotor speed thresholds. Once turbo generator 302 is engaged, torque is provided through the main drive system as indicated by the solid lines and arrowheads between turbo generator 302, sprag clutch 304, combining gearbox 308, main rotor gearbox 306 and main rotor system 310, as well as between electric motor 316, sprag clutch 318 and combining gearbox 308, as best seen in FIG. 5D.

The flight control computers of the present embodiments preferably include computing elements such as non-transitory computer readable storage media that include computer instructions executable by processors for controlling flight operations. The computing elements may be implemented as one or more general-purpose computers, special purpose computers or other machines with memory and processing capability. The computing elements may include one or more memory storage modules including, but is not limited to, internal storage memory such as random access memory, non-volatile memory such as read only memory, removable memory such as magnetic storage memory, optical storage, solid-state storage memory or other suitable memory storage entity. The computing elements may be implemented as microprocessor-based systems operable to execute program code in the form of machine-executable instructions. The computing elements may be selectively connectable to other computer systems via a proprietary encrypted network, a public encrypted network, the Internet or other suitable communication network that may include both wired and wireless connections.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A power management system for a multi engine rotorcraft having a main rotor system with a main rotor speed, the power management system comprising:
    a first engine providing a first power input to the main rotor system;
    a second engine selectively providing a second power input to the main rotor system, the second engine having at least a zero power input state and a positive power input state;
    a combining gearbox coupling the first and second engines to the main rotor system;
    a sprag clutch having an input side coupled to the second engine and an output side coupled to the combining gearbox, the sprag clutch configured to generate power input step changes between the zero power input state and the positive power input state when a rotating speed of the input side transitions above or below a rotating speed of the output side; and
    a power anticipation system configured to provide the first engine with a power adjustment signal in anticipation of the power input step changes;
    wherein, the power adjustment signal causes the first engine to adjust the first power input coincident with the power input step changes to maintain the main rotor speed within a predetermined rotor speed threshold range.

2. The power management system as recited in claim 1 wherein the first engine further comprises a main engine and wherein the second engine further comprises a supplemental power unit.

3. The power management system as recited in claim 1 wherein the first engine further comprises a first main engine and wherein the second engine further comprises a second main engine.

4. The power management system as recited in claim 1 wherein the first engine further comprises a first gas turbine engine and wherein the second engine further comprises a second gas turbine engine.

5. The power management system as recited in claim 1 wherein the first engine further comprises a gas turbine engine and wherein the second engine further comprises an electric motor.

6. The power management system as recited in claim 1 wherein the power anticipation system further comprises a pilot operated input configured to generate the power adjustment signal for the first engine and to provide the second engine with a power input state change signal.

7. The power management system as recited in claim 1 wherein the power anticipation system further comprises one or more sensors configured to detect one or more flight parameters of the rotorcraft to form sensor data and a power anticipation module configured to generate the power adjustment signal for the first engine and to provide the second engine with a power input state change signal responsive to the sensor data.

8. The power management system as recited in claim 7 wherein the sensor data further comprises collective control data.

9. The power management system as recited in claim 7 wherein the sensor data further comprises first engine speed data.

10. The power management system as recited in claim 7 wherein the sensor data further comprises first engine torque output data.

11. The power management system as recited in claim 7 wherein the power anticipation module is implemented on a flight control computer.

12. The power management system as recited in claim 1 wherein the power adjustment signal causes the first engine to reduce the first power input coincident with the power input step changes from the zero power input state to the positive power input state.

13. The power management system as recited in claim 1 wherein the power adjustment signal causes the first engine to increase the first power input coincident with the power input step changes from the positive power input state to the zero power input state.

14. The power management system as recited in claim 1 wherein the power adjustment signal causes an adjustment in the quantity of fuel injected into the first engine.

15. The power management system as recited in claim 1 wherein the positive power input state further comprises a full power input state.

16. The power management system as recited in claim 1 wherein the power adjustment signal is mechanically coupled to the first engine.

17. The power management system as recited in claim 1 wherein the power adjustment signal is electrically coupled to the first engine.

18. The power management system as recited in claim 1 wherein the predetermined rotor speed threshold range is two percent above and two percent below the main rotor speed.

19. The power management system as recited in claim 1 wherein the predetermined rotor speed threshold range is one percent above and one percent below the main rotor speed.

20. A rotorcraft comprising:

a fuselage;

a main rotor system rotatable relative to the fuselage, the main rotor system having a main rotor speed;

a first engine providing a first power input to the main rotor system;

a second engine selectively providing a second power input to the main rotor system, the second engine having at least a zero power input state and a positive power input state;

a combining gearbox coupling the first and second engines to the main rotor system;

a sprag clutch having an input side coupled to the second engine and an output side coupled to the combining gearbox, the sprag clutch configured to generate power input step changes between the zero power input state and the positive power input state when a rotating speed of the input side transitions above or below a rotating speed of the output side; and a power anticipation system configured to provide the first engine with a power adjustment signal in anticipation of the power input step changes;

wherein, the power adjustment signal causes the first engine to adjust the first power input coincident with the power input step changes to maintain the main rotor speed within a predetermined rotor speed threshold range.

\* \* \* \* \*